Nov. 27, 1945.   C. HOLLERITH   2,389,977
RIGHT-LEFT NOZZLE FITTING
Filed Oct. 4, 1943
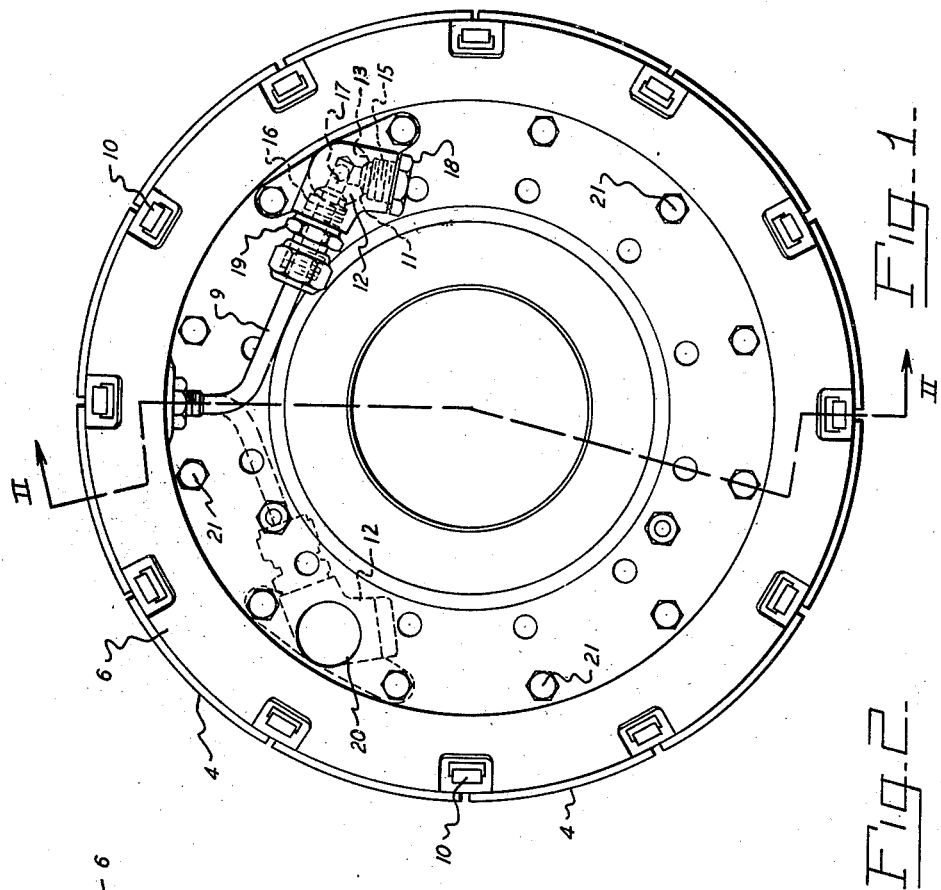
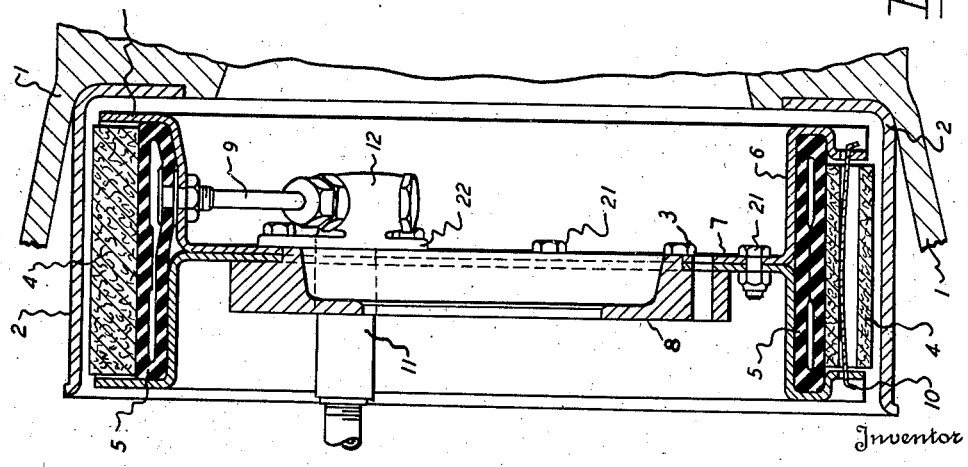
Inventor
CHARLES HOLLERITH
By Beaman & Langford
Attorneys Patented Nov. 27, 1945

2,389,977

UNITED STATES PATENT OFFICE 2,389,977

RIGHT-LEFT NOZZLE FITTING

Charles Hollerith, Jackson, Mich., assignor to Hayes Industries, Inc., Jackson, Mich., a corporation of Michigan Application October 4, 1943, Serial No. 504,859

1 Claim. (Cl. 188—152)

The present invention relates to brake construction and more particularly to a fitting which may be used in either a right or left handed manner.

In the part of brake structures providing a connection between a source of hydraulic fluid under pressure and a brake expander tube, there is a fitting which is immediately connected to the tubular stem attached to the expander tube. Under certain arrangements circumstances require that the fitting be right or left handed. According to the present invention, the fitting is made in an angulated form with threaded connections at each end so that when used in a right handed manner, one end of the angulated fitting may be connected to the expander tube stem and the other end plugged, whereas when used in a left handed manner, the opposite end of the angulated fitting is plugged and the end which was plugged when used in a right hand manner is connected to the expander tube stem.

An object of the present invention is to provide a single fitting which may be assembled so as to be either right or left handed.

Another object of the invention is to provide a fitting for brake structures for providing a connection with the expander tube stem, the fitting having two openings, one extending in one direction and the other extending in another direction, one of the openings being connected to the expander tube stem and the other opening plugged in order to permit under certain circumstances a connection of the expander tube stem to the previously plugged opening and the plugging of the other opening.

These and other objects residing in the arrangement, combination and construction of the parts will be apparent from the following specification when taken with the accompanying drawing, in which Fig. 1 is a side elevation of a wheel according to the present invention, and Fig. 2 is a section on the line II—II of Fig. 1.

Referring particularly to the drawing, the reference character 1 indicates a wheel having a brake drum 2 with which is associated a braking structure generally indicated by the reference character 3. The braking structure comprises brake blocks 4, which preferably are the type wherein there are a plurality of said brake blocks arranged annularly for engagement with the drum 2. The brake blocks 4 are arranged to be expanded outwardly by an annular expander tube 5 and the brake blocks 4 and the expander tube 5 are supported in a rim 6.

The rim 6 is supported by a frame or web structure 7, which in turn is supported from the body of the vehicle with which the brake is associated, and in the case of the present invention, which relates to airplane wheels, from the landing gear 8, as shown in dotted outline.

The expander tube 5 is provided with a tubular stem 9 through which hydraulic fluid is conducted for forcing the brake blocks 4 outwardly into engagement with the drum 2. The brake blocks 4, after being expanded outwardly, may be retracted by the retractor springs 10. The specific forms of the expander tube 5 and brake blocks 4 are not a part of the present invention although the particular form of brake block and retractor spring assembly is shown more particularly in my copending application Serial No. 275,355, filed May 24, 1939, now Patent No. 2,350,038, dated May 30, 1944. The tubular stem 9 is connected to a suitable source of hydraulic fluid under pressure by inlet member 11 through an angulated fitting 12. The inlet member 11 projects through an opening 13 in the web 3.

The fitting 12 is in the form of an elbow having threaded openings 15 and 16. The openings 15 and 16 extend at an angle to one another and communicate with and are connected by an internal port 17. The fitting 12 is angulated only to the extent that the openings 15 and 16 are arranged at an angle to one another. Consequently, the external shape of the fitting is considered to be of little importance except insofar as it provides an economical use of material. As shown particularly in Fig. 1, the opening 15 is sealed by a plug 18 and the opening 16 has screwed thereinto a packing gland assembly 19 for providing a fluid tight connection with the tubular stem 9.

It will be observed that the inlet connecting means 11 extends in a direction parallel to the axis of the wheel and brake structure and that the plane of the openings 15 and 16 is normal to the axis of the wheel and brake structure. Also, the tubular stem 9 has a portion which extends generally radially with respect to the wheel and another portion which extends at an angle to the radial portion. It is the angular portion as shown in Fig. 1 which is connected to the fitting 12.

Should it be desired to have the fitting 12 on the opposite side of a vertical axis passing through the stem 9, and if the openings 15 in the fitting 12 were permanently sealed, it would be necessary to employ a different type of fitting. However, according to the present invention, the same fitting may be employed. In order to provide for possible use of the fitting 12 at the opposite side of a vertical axis through the stem 9 from the position shown, that is, with the inlet member 11 extending through the opening 13, there is provided in the web 7 an opening 20 which corresponds to the opening 13. Assuming that the stem 9 is not connected to the fitting 12, the fitting 12 is transferred to the position wherein the inlet member 11 extends through the opening 20 to make the transfer. The web 7 and clamping bolt 21, which are employed to secure the fitting 12 to the web 7 through a bracket 22, are removed and the bracket 22 is secured to the portion of the web 7 adjacent the opening 20 by other bolts 21, as shown adjacent the opening 20, with the inlet member 11 extending through the opening 20. In this position, which is shown in dotted outline in the drawing, the opening 15 will be directed in the general direction of the stem 9. The stem 9 is swung around in radial portions and the stuffing box assembly 19 is employed to connect the stem 9 to the opening 15 from which the plug 18 has been removed. The plug 18 is then used to seal the opening 16. It will be understood that in order to accomplish the reversal of the connection between the openings 15 and 16 and the plug 18 and stuffing box assembly 19 respectively, that the threads in the openings 15 and 16 must have the same specifications.

It will be apparent from the foregoing specification that the position of the fitting 12 in full line in Fig. 1 may be considered as a right hand position, and the position in dotted line in Fig. 1 may be considered as a left hand position. It will be further apparent that by the employment of the present invention, a single fitting 12 may be employed for making the fluid connection with the stem 9 with either a right or left hand connection, it being only necessary to change over the sealing by the plug 18 from the openings 15 or 16 as the case may be and to connect the stem 9 to the opposite ends of the fitting 12.

Having thus described my invention what I desire to secure by Letters Patent and claim is:

In a hydraulic brake structure, a brake supporting structure designed to reduce the number of parts required to provide similar right and left-hand brakes, and including a pair of sheet metal stampings in back-to-back relation and collectively defining a radial torque flange, a pair of aligned holes in each of said stampings, a hydraulic fitting mounted in one of said pairs of aligned holes and proportioned to fit in said other pair of aligned holes if selected, said fitting having an axial extending portion adapted to be received in said aligned openings, a pair of tubular threaded connectors constituting a part of said fitting having the connecting ends thereof angularly disposed to each other and having common communication with said axial extending portion, and a hydraulic inlet connection located between said pairs of aligned holes and connected to one of said threaded connectors, dependent upon in which set of aligned holes said fitting is located.

CHARLES HOLLERITH.